April 10, 1956 R. A. PAULTON 2,741,205
HYDRAULIC PRESS STRUCTURE
Filed Aug. 12, 1952 3 Sheets-Sheet 1

INVENTOR.
RICHARD A. PAULTON
BY
H. K. Parsons & C. W. Wright,
ATTORNEYS

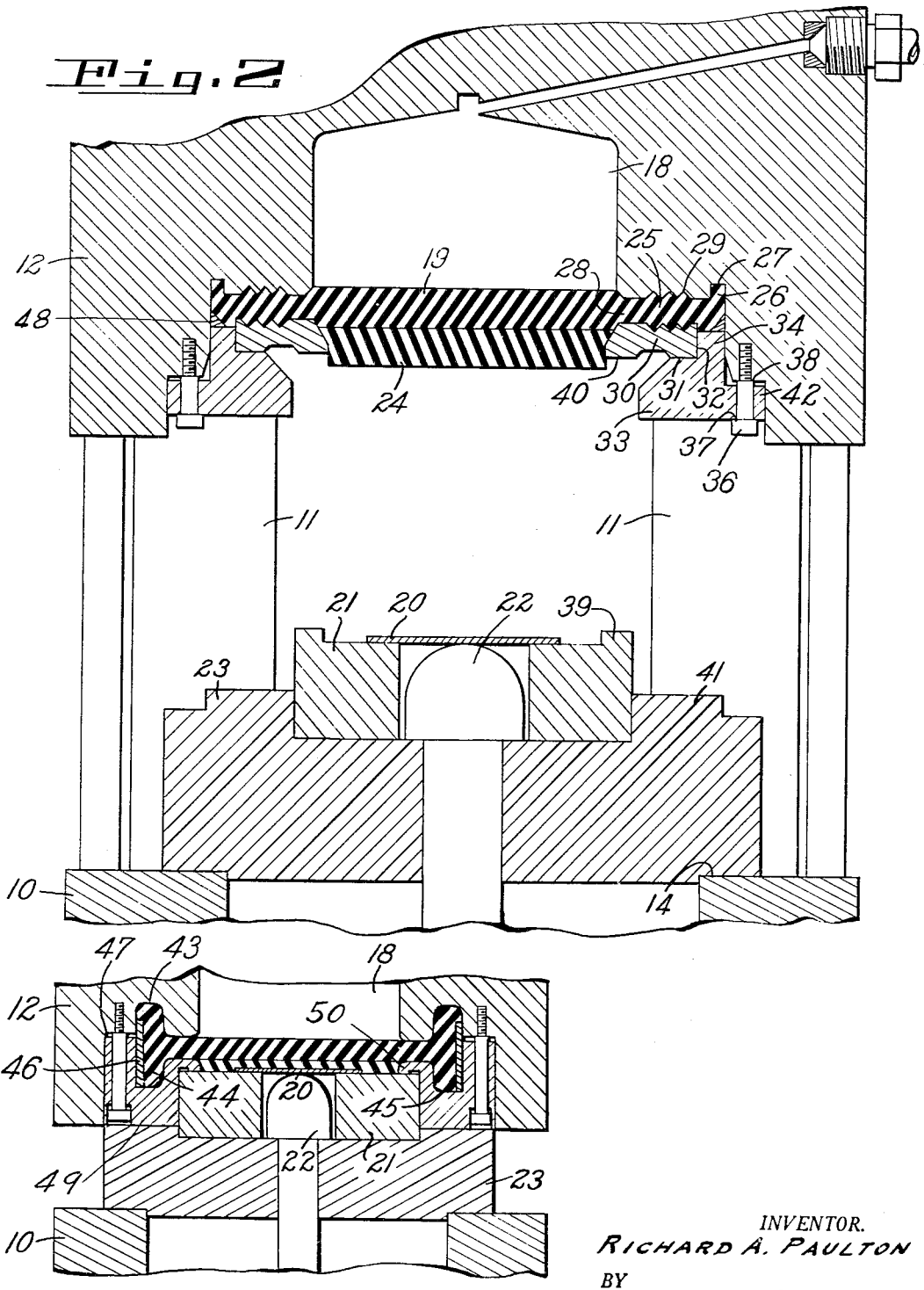

April 10, 1956  R. A. PAULTON  2,741,205
HYDRAULIC PRESS STRUCTURE
Filed Aug. 12, 1952  3 Sheets-Sheet 3

INVENTOR.
RICHARD A. PAULTON
BY
H. K. Parsons & L. W. Wright.
ATTORNEYS.

United States Patent Office 2,741,205
Patented Apr. 10, 1956

2,741,205

HYDRAULIC PRESS STRUCTURE

Richard A. Paulton, Cozaddale, Ohio, assignor to The Cincinnati Milling Machine Co., Cincinnati, Ohio, a corporation of Ohio Application August 12, 1952, Serial No. 303,870

3 Claims. (Cl. 113—44)

This invention relates to improvements in hydraulic press structures and has particular reference to that type of press employing a diaphragm closed pressure dome structure for use in metal forming or the like.

In previously known press structures of this type certain difficulty has been experienced when making heavy draws due either to temperature effected or pressure produced expansion shifting or relative movement of the die elements, and it has been necessary to utilize a multiplicity of heavy securing elements to effect proper retention of the dome sealing diaphragm in position during continuous production operations.

The present invention has been found particularly advantageous in connection with heavy metal forming presses employing during the forming operation pressures of fifteen thousand or more pounds to the square inch. These heavy pressures tend to create a relative stretching or breathing condition as respects the press elements and in the absence of most perfect securing and sealing means an extrusion through any existing minute spaces of the flowable material of the diaphragm or of the oil or pressure medium in the diaphragm close chamber.

For assembly and diaphragm replacement, it is necessary that the dome and diaphragm retaining members have a slight clearance or sliding fit, which in the absence of special sealing affords opportunity for leakage or extrusion under these high working pressures. Also, in the case of ordinary bolted together diaphragm retaining devices, for safety and proper retention of the parts the total tension exerted by the clamping bolts or the like, must be considerable in excess of the maximum total pressure to be developed in the sealed dome. Provision and utilization of such fastenings adds materially to the production cost of the machine and results in considerable shutdown time and loss of production when diaphragm replacement is necessary.

It is one of the objects of the present invention to provide an improved construction of diaphragm retaining mechanism which will permit of elimination of the previously utilized multiplicity of heavy diaphragm retaining means and the substitution therefor of a minimum number of light retaining elements, thereby facilitating replacement of diaphragms in the machine with a minimum of shutdown time.

A further object of the invention is the provision of a press structure which will insure continuous tight interengagement of the die elements of the machine and prevent either pressure loosening of the diaphragm retaining means or undesired diaphragm extrusion during pressing operations.

Another object of the invention is the provision of improved cooperating elements effective in connection with a diaphragm type press structure which will aid in proper positional retention of the diaphragm, adequate sealing of the dome chamber, and prevention of injury to the diaphragm under extreme pressure conditions.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2 is a vertical sectional view through the pressure dome, work supporting nest and associate parts with the dome in a revised or work receiving position.

Figure 5 is a fragmentary sectional view of a modified form of the invention.

Figure 1:
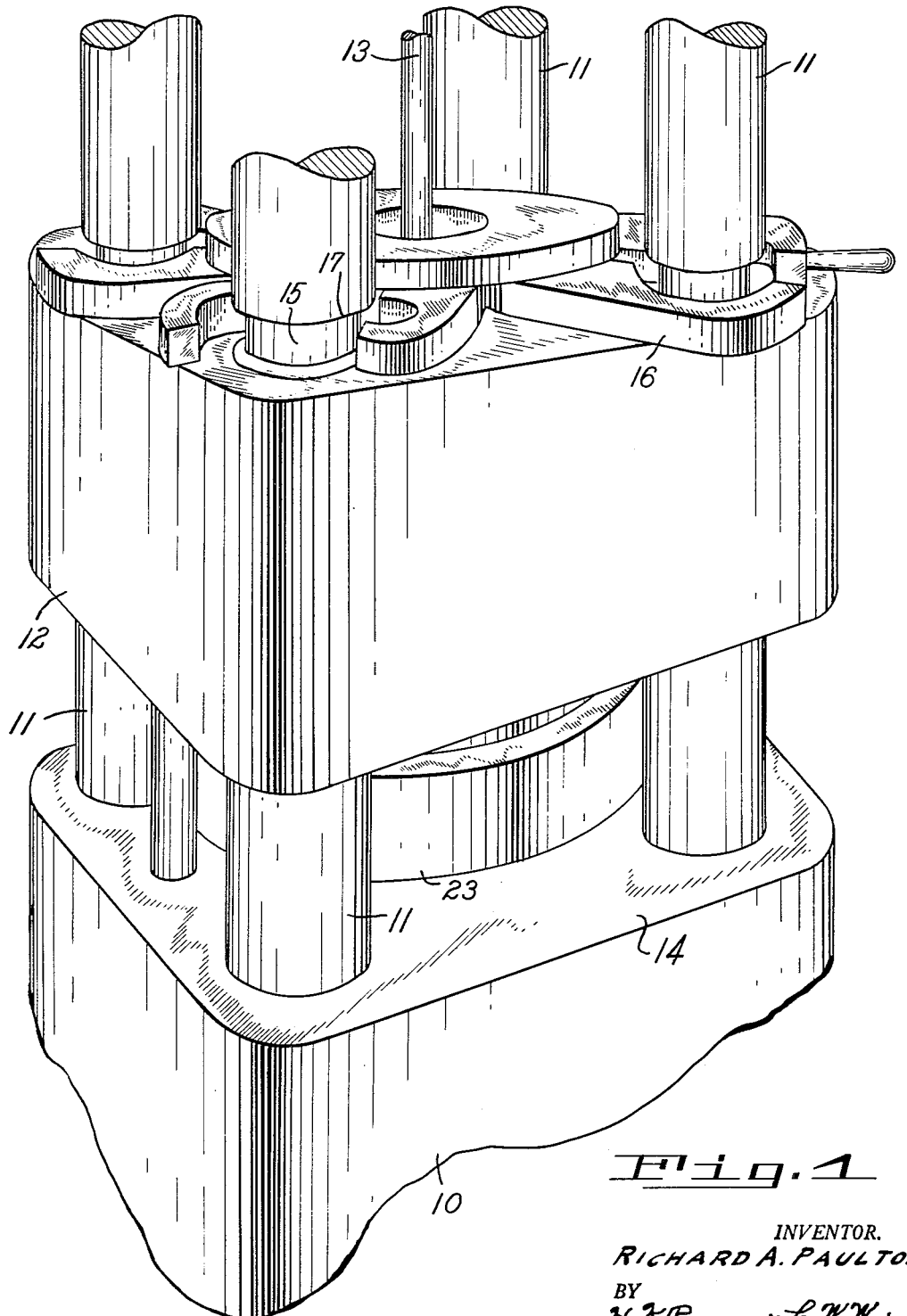
Figure 1 is a fragmentary perspective view of a press structure for utilization of the present invention.

In the drawings the invention has been shown as utilized in connection with a type of hydraulic press particularly illustrated in co-pending application, Serial 119,066, filed October 1, 1949, now Patent 2,696,183. The machine in question includes a base 10 having rising therefrom the guiding and supporting columns 11 on which is vertically slidable the dome 12 movable by the coupled piston rod 13 which, as shown in the application referred to, is actuated by a hydraulic cylinder not here shown, the rod 13 constituting a means for moving the dome toward and from the abutment face 14 of the base.

To secure the dome in a lowered position the columns are formed with grooves at 15 to receive the jaws of the locking means 16 mounted on the upper face of the dome in such manner that when interengaged with the grooves 15 the locking means will bear against the upper face of the dome and the underface at the shoulders 17 bounding the grooves 15, thus firmly mechanically locking the dome to the columns.

The structure thus shown is entirely adequate for retaining the parts in proper relationship during ordinary forming operations. However, when difficult forming operations are to be performed by the use of high pressures, running, for example, up to 15,000 pounds to the square inch or in the case of appreciable temperature fluctuations there may be a stretch or elongation of the columns 11 to an extent permitting appreciable retraction of the lower or operative face of the dome with respect to the abutment surface 14 of the base.

In the utilization of presses of the character here under consideration, the dome is formed with a pressure chamber 18 closed by a flexible diaphragm designated as an entirety by the numeral 19 which overlies the work piece 20. This work piece is supported on a nest 21 circumscribing the suitably actuated punch or die member 22, the nest, in turn, being supported by the bolster ring 23 which rests on the supporting face 14 of the base 10.

The utilization of the individual elements 21 and 23 permit of interchanging of parts according to the particular die or punch to be utilized, for example, but the elements 21 and 23 together comprise work supporting abutment means rigidly mounted upon the base, and are so hereafter generically referred to.

The flexible diaphragm comprises the main section 19 which may be provided as desired with extra wear and reenforcing layers generally indicated at 24. The section 19 has an attaching portion 25 with a peripheral flange or bead 26 fitting into the groove 27 in the dome and the intermediate attaching portion 28 interlocking with the grooves or serrations 29 in the dome. For retaining the diaphragm in position use is made of the floating clamping and sealing ring 30 having the outer abutment portion 31 fitting the recess or seat 32 of the floating retaining ring 33, and an intermediate unsupported portion permitting yielding or deflection of the inner or central portion of the ring relative to the seat.

This retaining ring 33 has an annular flange 34 surrounding the ring 30 and itself providing an abutment clampingly engaging the outer attaching portion 25 of the diaphragm, and wedging in position the annular sealing ring 48. This ring seals off the junction of the parts 12 and 33, effecting corner compression of peripheral edge of the diaphragm and prevents the extrusion between said parts. A series of bolts 36 each have a first abutment face or shoulder 37 engaging the lower portion of the clamp or retaining ring for forcing the same upward into desired clamping engagement with the floating ring and the diaphragm for securing the parts together with the attaching portion of the diaphragm under adequate retaining compression.

Each of these bolts is provided with a second abutment face or shoulder 38 engaging the dome to limit the tightening movement of the retaining ring. The spacing between the abutments or shoulders 37 and 38 is slightly greater than the space between the included upper and lower faces of the retaining ring so that when the bolts are completely tightened the retaining ring has the capacity for limited additional clamping movement.

Figure 4:
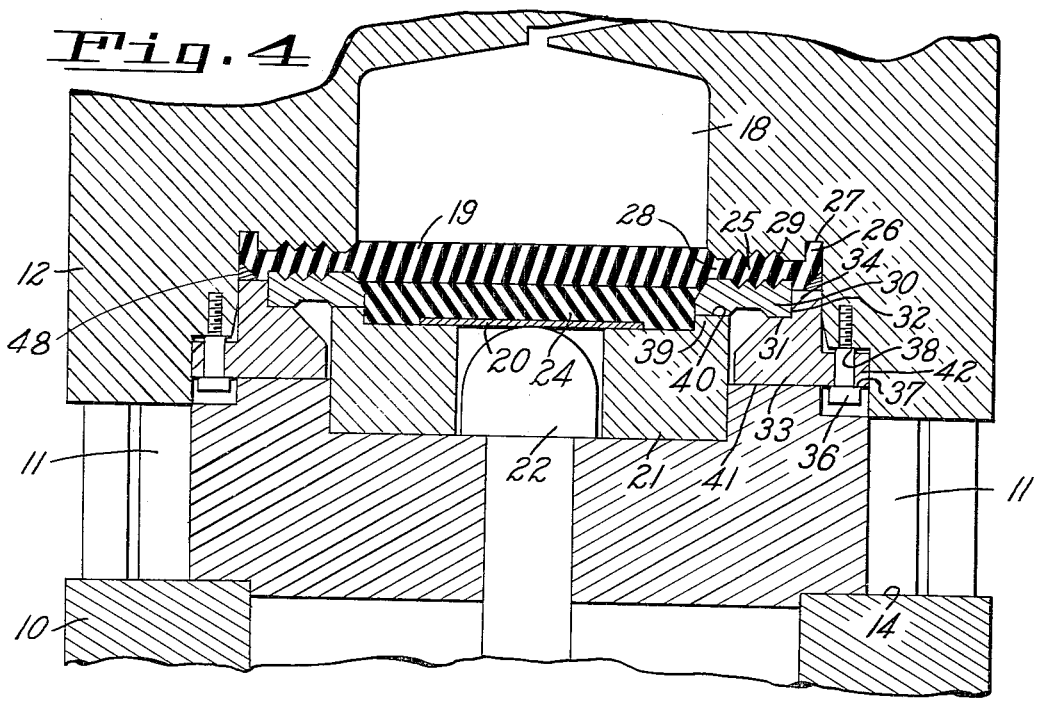
Figure 4 is a similar fragmentary view illustrating the position occupied by the parts during a forming operation.
Figure 3:
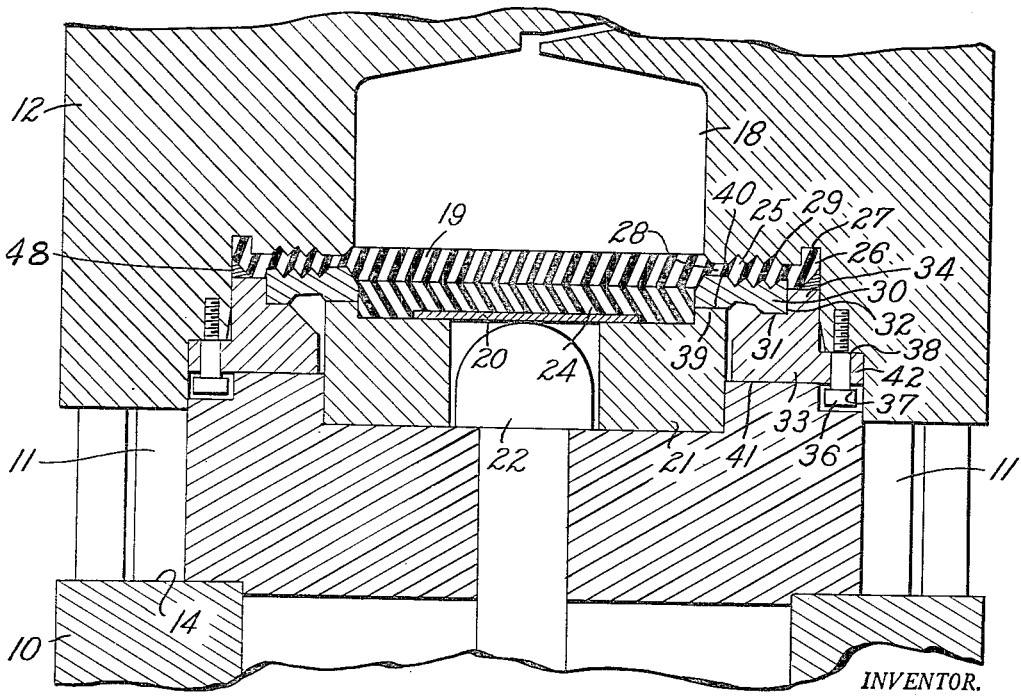
Figure 3 is a similar sectional view showing the dome in its initial lowered position.

The purpose and advantage of this structure will be readily apparent by comparison of Figures 3 and 4. In these figures it will be noted that the nest 21 is provided with a shoulder 39 fitting under the inner fulcrum edge or flange 40 of the floating clamping and sealing ring 30 having its outer edge 31 supported on the seat 32 as a fulcrum, while either the nest 21 itself or the adjacent portion of the bolster 23 is provided with the abutment ledge or shoulder 41 for engagement with the lower face of the retaining ring 33. Particular attention is invited to the fact that the dimensional spacing from the top of the shoulder 39 to the upper face of the ledge 41 is slightly greater than the normal space or dimension from the underface of the fulcrum edge 40 of the floating sealing ring 30 to the lower abutment face of the retaining ring 33. As a result, when the dome is moved toward the work as supported by the abutment members 21—23 carried on the base of the machine, as pressure is applied firmly to seat the dome in position, as by the piston effected actuation of the rod 13, the abutment portion 40 of the floating ring will engage the shoulder 39 so that the ring will be rocked or moved upward effecting an additional compression of the portion 28 of the diaphragm against the underface of the dome before the retaining ring 33 engages and is seated against the shoulder 41. The relative dimensions of the parts are such that in this final seating operation the member 33 will also be forced upwardly, moving relative to the retaining shoulders 37 of the attaching bolts so that when the dome is locked in position by the securing means 16 all retaining pressure will have been released as respects the bolts. Consequently, the locking means 16 interengaged with the columns 11 provide the necessary retaining force for holding the diaphragm in position as a closure for the dome during the operation of the machine and the securing bolts 36 need only be sufficient in size and number to hold the parts in position when not under pressure.

With this construction it will be evident that should there be any elongation of the normal column determined space between the locked position of the dome to the columns and the base of the machine that the reaction of the internal dome pressure against the diaphragm will force and maintain the fulcrum edge 40 of the floating ring in tight sealing engagement with the shoulder of the nest plate, preventing any extrusion of the diaphragm or damage to it as might take place if the lower diaphragm clamp unit were raised as an entirety out of engagement with the nest during machine operation. Additionally, should there be any such slight upward movement of the dome, due to the initial upward forcing of the retaining ring 33 by the clamping action of the re-taining ring itself will still remain seated on the shoulder 41, relieving the retaining bolts of the extreme pressure strain which would be exerted against such bolts in the absence of the described floating action of the retaining ring. It will, of course, be understood that the amounts of such relative movement are relatively minute in character and that under all conditions adequate pressure is maintained by the abutments on the base against the attaching portion of the diaphragm to maintain the same in proper sealing relation to the pressure chamber of the dome so that the diaphragm is at all times adequately compressed and locked against the dome.

In the form of the invention shown in Figure 2 it will be noted that the outer periphery of the retaining ring 33 has a sliding fit with the interior of the bolt receiving rim 42 of the dome being sealed at this point by the ring 48. In Figure 5 there has been shown an alternative form of construction in which the dome has the diaphragm bead receiving recess 43 while the diaphragm is provided with an additional securing rib 44 fitting in a recess 45 in the retaining ring 49. In this form of construction a thin ring or cylinder 46 is interposed between the inner wall of the combined recesses 43, 45 and the double rib or rim on the diaphragm, this cylinder being of sufficient height to extend above and form a complete seal for the joint 47 between the dome and ring 33, thus allowing for relative play of the parts without possibility of extrusion or extension of the periphery of the diaphragm into the joint 47. In this figure, the ring 49 has an integral flexible flange 50 abutting the nest block 21.

From the foregoing it will be seen that there has been provided in the present invention an improved diaphragm securing structure in which the primary heavy clamping pressure for retaining the diaphragm during a forming operation is created by the means for moving the pressure dome into its effective position, and that the normal retaining connections for the diaphragm have been so constructed as to have a yielding or breathing effect to take care of any undesirable spacing variance during the operation of the machine. It will be particularly noted that the action of the floating clamping ring is such that as the press is closed it may be given a slightly distorting upward deflection with respect to the other parts of the dome structure, securely retaining the diaphragm against any initially created pressure prior to upward displacement of the diaphragm by movement of the forming press, while at the same time the mounting of this floating clamping ring is such that the unsupported intermediate zone of its overhang portion may yield in the opposite direction to maintain at all times a tight metal to metal seal between the inner edge of the ring and the nest or abutment plate which surrounds the punch.

What is claimed is:

1. A hydraulic press including a work supporting unit and an opposed hollow dome having a diaphragm engaging face, means for moving the dome toward the unit into forming position, a flexible diaphragm for engagement with a workpiece on the supporting unit, said diaphragm forming a closure for the dome and having a peripheral attaching portion having one face engaging the face of the dome, means for securing the diaphragm to the dome including a first floating clamping ring engaging the other face of said attaching portion, a second floating clamping ring having a diaphragm clamping portion and a floating clamping ring engaging portion, means carried by the dome and engaging said second clamping ring for securing the rings in clamping engagement with the diaphragm, the first floating clamping ring having a flange portion overhanging the second clamping ring, and an abutment member carried by the work supporting unit having a portion for engaging the inner portion of the flange to urge the first floating ring against the diaphragm as the dome is moved toward the work supporting unit, the supporting unit having an additional portion disposed in position to engage said second clamping ring jointly to urge both of said rings into diaphragm clamping position as the dome is moved into forming position independent of the reaction of the support against the flange.

2. A hydraulic press structure including a base, an abutment member mounted on the base, a pressure dome movable in a direction toward and from said abutment member, and means for securing the dome in engagement with the abutment member, said dome member including a hollow head having a depending peripheral portion formed with an annular diaphragm receiving groove, an elastic diaphragm forming a closure for the dome having an upper annular rib fitting within the groove, a retaining ring unit for the diaphragm having a diaphragm clamping portion end securing bolts for tightening the clamping portion toward the dome to compress said rib and diaphragm between the dome and ring, the bolts having a first abutment portion for engagement with one surface of the ring and a second abutment portion projecting adjacent the other surface of the ring for engagement with the dome, the distance between said abutment portions being greater than the distance between the ring surfaces to provide a clearance between the adjacent surfaces of the dome and ring when the parts are assembled, and means for pressing the assembled dome a sufficient distance toward the base to force the ring against the abutment on the base to effect an additive movement of the ring toward the dome to increase the retaining pressure on the diaphragm independent of the bolt effected retaining pressure, the retaining ring unit including a peripherally supported and inwardly extending flange located in underlying relation to the diaphragm and the body of the dome, and the abutment on the base having a projecting portion positioned to engage and deflect the flange in a direction toward the dome as the dome is pressed toward the base.

3. A hydraulic press structure including a base, an abutment member mounted on the base, a pressure dome movable in a direction toward and from said abutment member, and means for securing the dome in engagement with the abutment member, said dome member including a hollow head having a depending peripheral portion formed with an annular diaphragm receiving groove, an elastic diaphragm forming a closure for the dome having a peripheral flange fitting within the groove, a retaining ring unit for the diaphragm having a diaphragm clamping portion, and securing bolts for tightening the clamping portion toward the dome to compress said rib and diaphragm between the dome and ring, the bolts having a first abutment portion for engagement with one surface of the retaining ring unit and a second abutment portion projecting adjacent the other surface of the retaining ring unit for engagement with the dome, the distance between said abutment portions being greater than the distance between the ring surfaces to provide a clearance between the adjacent surfaces of the dome and ring when the parts are assembled, and means for pressing the assembled dome a sufficient distance toward the base to force the ring against the abutment on the base to effect an additive movement of the ring toward the dome to increase the retaining pressure on the diaphragm independent of the bolt effected retaining pressure.

References Cited in the file of this patent
UNITED STATES PATENTS

| | | |
|---|---|---|
| 1,547,871 | Grunberg | July 28, 1925 |
| 2,066,085 | Whistler | Dec. 29, 1936 |
| 2,280,865 | Stossel | Apr. 28, 1942 |
| 2,317,869 | Walton | Apr. 27, 1943 |
| 2,341,002 | Vollrath | Feb. 8, 1944 |
| 2,418,393 | Bridgens | Apr. 1, 1947 |
| 2,512,161 | Ledel | June 20, 1950 |
| 2,550,672 | Chyba | May 1, 1951 |
| 2,696,183 | Chyba | Dec. 7, 1954 |